United States Patent
Zhu et al.

(10) Patent No.: US 12,282,600 B1
(45) Date of Patent: Apr. 22, 2025

(54) WEARABLE HAPTIC DEVICES FOR MODULATING PERCEIVED ROUGHNESS OF PHYSICAL SURFACES IN REAL-TIME SIMULATION IN MIXED REALITY ENVIRONMENTS

(71) Applicant: City University of Hong Kong, Hong Kong (HK)

(72) Inventors: Kening Zhu, Hong Kong (HK); Xinge Yu, Hong Kong (HK); Shaoyu Cai, Hong Kong (HK); Haichen Gao, Hong Kong (HK); Qi Zhang, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 18/581,360

(22) Filed: Feb. 19, 2024

(51) Int. Cl.
  *G06F 3/01*  (2006.01)
  *G06T 19/00*  (2011.01)
(52) U.S. Cl.
  CPC .............. *G06F 3/014* (2013.01); *G06F 3/016* (2013.01); *G06T 19/006* (2013.01)
(58) Field of Classification Search
  CPC ............................. G06F 3/014; G06T 19/006
  See application file for complete search history.

(56) References Cited

U.S. PATENT DOCUMENTS

| | | | | |
|---|---|---|---|---|
| 9,104,271 | B1 * | 8/2015 | Adams .................. | G06F 3/0233 |
| 2010/0231540 | A1 * | 9/2010 | Cruz-Hernandez ..... | G06T 15/04 |
| | | | | 345/173 |
| 2016/0296838 | A1 * | 10/2016 | Goetgeluk .............. | G06F 3/014 |
| 2017/0123580 | A1 * | 5/2017 | Chiang ................ | G06F 3/04166 |
| 2019/0346938 | A1 * | 11/2019 | Wang ..................... | G06F 3/0446 |
| 2020/0093679 | A1 * | 3/2020 | Sonar ...................... | G01L 5/228 |
| 2022/0400792 | A1 * | 12/2022 | Kim ...................... | A63B 71/081 |

OTHER PUBLICATIONS

Wouter M. Bergmann Tiest et al., "Analysis of haptic perception of materials by multidimensional scaling and physical measurements of roughness and compressibility", Acta psychologica, 2006, vol. 121, No. 1, p. 1-20.

Shuhei Asano et al., "Vibrotactile display approach that modifies roughness sensations of real textures", 2012 IEEE RO-MAN: The 21st IEEE International Symposium on Robot and Human Interactive Communication, 2012, p. 1001-1006.

(Continued)

*Primary Examiner* — Benjamin C Lee
*Assistant Examiner* — Nathan P Brittingham
(74) *Attorney, Agent, or Firm* — Idea Intellectual Limited; Margaret A. Burke; Sam T. Yip

(57) ABSTRACT

A wearable haptic modulation device for real-time simulation of texture properties of a material surface in mixed reality environments is provided. Particularly, it includes a U-shaped pneumatic actuator surrounds a user's fingertip, a finger-housing support creating a space for fingertip containment, a resonant actuator on the finger-housing support generating vibrotactile feedback to enhance perceived roughness on touched physical surfaces, and a pneumatic control system generating pneumatic actuation to reduce the perceived roughness on touched physical surface. Notably, the U-shaped pneumatic actuator allows direct contact of the user's fingerpad with the touched physical surface.

8 Claims, 12 Drawing Sheets

(56) References Cited

OTHER PUBLICATIONS

Yoichi Ochiai et al., "Diminished haptics: Towards digital transformation of real world textures", International Conference on Human Haptic Sensing and Touch Enabled Computer Applications, 2014, p. 409-417.

Aditya Shekhar Nittala et al., "Like a second skin: Understanding how epidermal devices affect human tactile perception," Proceedings of the 2019 CHI Conference on Human Factors in Computing Systems, 2019, p. 1-16.

Karun B. Shimoga, "A Survey of Perceptual Feedback Issues in Dexterous Telemanipulation: Part II. Finger Touch Feedback", Proceedings of IEEE Virtual Reality Annual International Symposium, 1993, p. 271-279.

Yudai Tanaka et al., "Full-hand electro-tactile feedback without obstructing palmar side of hand", Proceedings of the 2023 CHI Conference on Human Factors in Computing Systems, 2023, p. 1-15.

Allison M. Okamura et al., "Vibration feedback models for virtual environments", Proceedings of the 1998 IEEE International Conference on Robotics and Automation, 1998, vol. 1, p. 674-679.

Yusuke Ujitoko et al., "Modulating fine roughness perception of vibrotactile textured surface using pseudo-haptic effect", IEEE Transactions on Visualization and Computer Graphics, 2019, vol. 25, No. 5, p. 1981-1990.

A. J. Brisben et al., "Detection of vibration transmitted through an object grasped in the hand", Journal of neurophysiology, 1999, vol. 81, No. 4, p. 1548-1558.

Nils Landin et al., "Dimensional reduction of high-frequency accelerations for haptic rendering", Haptics: Generating and Perceiving Tangible Sensations: International Conference, 2010, p. 79-86.

Shogo Okamoto et al., "Psychophysical dimensions of tactile perception of textures", IEEE Transactions on Haptics, 2012, vol. 6, No. 1, p. 81-93.

Mark Hollins et al., "Evidence for the duplex theory of tactile texture perception", Perception & psychophysics, 2000, vol. 62, No. 4, p. 695-705.

Bob G. Witmer et al., "Measuring presence in virtual environments: A presence questionnaire", Presence, 1998, vol. 7, No. 3, p. 225-240.

Aaron Bangor et al., "An empirical evaluation of the system usability scale", International Journal of Human-Computer Interaction, 2008, vol. 24, No. 6, p. 574-594.

David T. Blake et al., "Neural coding mechanisms in tactile pattern recognition: the relative contributions of slowly and rapidly adapting mechanoreceptors to perceived roughness", The Journal of Neuroscience, 1997, vol. 17, No. 19, p. 7480-7489.

George A. Gescheider et al., "Perception of the tactile texture of raised-dot patterns: A multidimensional analysis", Somatosensory and Motor Research, 2005, vol. 22, No. 3, p. 127-140.

Charles E. Connor et al., "Neural coding of tactile texture: comparison of spatial and temporal mechanisms for roughness perception," The Journal of Neuroscience, 1992. vol. 12, No. 9, p. 3414-3426.

Lynette A. Jones et a., "Warm or cool, large or small? the challenge of thermal displays", IEEE Transactions on Haptics, 2008, vol. 1, No. 1, p. 53-70.

Joel D. Greenspan et al., "The primate as a model for the human temperature-sensing system: 2. area of skin receiving thermal stimulation (spatial summation)", Somatosensory Research, 1985, vol. 2, No. 4, p. 315-324.

Joseph C. Stevens et al., "Spatial summation and the dynamics of warmth sensation", Perception & Psychophysics, 1971, vol. 9, No. 5, p. 391-398.

Dale A. Lawrence et al., "Rate-hardness: A new performance metric for haptic interfaces", IEEE Transactions on Robotics and Automation, 2000, vol. 16, No. 4, p. 357-371.

Jun Shintake et al., "Soft pneumatic gelatin actuator for edible robotics", 2017 IEEE/RSJ International Conference on Intelligent Robots and Systems (IROS), 2017, p. 6221-6226.

Matheus S. Xavier et al., "Soft pneumatic actuators: A review of design, fabrication, modeling, sensing, control and applications", IEEE Access, 2022, vol. 10, p. 59442-59485.

Farzan Kalantari et al., "Exploring fingers' limitation of texture density perception on ultrasonic haptic displays", Haptics: Science, Technology, and Applications: 11th International Conference, 2018, p. 354-365.

Y.-J. Lue et al., "Thermal pain tolerance and pain rating in normal subjects: Gender and age effects", European Journal of Pain, 2018, vol. 22, No. 6, p. 1035-1042.

Ivan Blagojević, "Virtual reality statistics" [Online], 99 Firms, 2023, [retrieved on Aug. 14, 2024], Retrieved from the Internet: <URL: https://99firms.com/blog/virtual-reality-statistics/#gref>.

Shaoyu Cai et al., "ViboPneumo: A Vibratory-Pneumatic Finger-Worn Haptic Device for Altering Perceived Texture Roughness in Mixed Reality", IEEE Transactions on Visualization and Computer Graphics, 2024, p. 1-14.

Xiaojuan Chen et al., "Exploring relationships between touch perception and surface physical properties", International Journal of Design, 2009, vol. 3, No. 2, p. 67-76.

Emilia Djonov et al., "The semiotics of texture: From tactile to visual", Visual Communication, 2011, vol. 10, No. 4, p. 541-564.

Xinge Yu et al., "Skin-integrated wireless haptic interfaces for virtual and augmented reality", Nature, 2019, vol. 575, No. 7783, p. 473-479.

Olivier Bau et al., "Teslatouch: electrovibration for touch surfaces", Proceedings of the 23nd annual ACM symposium on User interface software and technology, 2010, p. 283-292.

Ken Nakagaki et al., "Materiable: Rendering dynamic material properties in response to direct physical touch with shape changing interfaces", Proceedings of the 2016 CHI Conference on Human Factors in Computing Systems, 2016, p. 2764-2772.

Séréna Bochereau et al., "Perceptual constancy in the reproduction of virtual tactile textures with surface displays", ACM Transactions on Applied Perception, 2018, vol. 15, No. 2, p. 1-12.

Eric Whitmire et al., "Haptic revolver: Touch, shear, texture, and shape rendering on a reconfigurable virtual reality controller", Proceedings of the 2018 CHI conference on human factors in computing systems, 2018, p. 1-12.

Donald Degraen et al., "Capturing tactile properties of real surfaces for haptic reproduction", The 34th Annual ACM Symposium on User Interface Software and Technology, 2021, p. 954-971.

Shaoyu Cai et al., "Thermairglove: A pneumatic glove for thermal perception and material identification in virtual reality", 2020 IEEE Conference on Virtual Reality and 3D User Interfaces (VR), 2020, p. 248-257.

Lifeng Zhu et al., "Tapetouch: A handheld shape-changing device for haptic display of soft objects", IEEE Transactions on Visualization and Computer Graphics, 2022, vol. 28, No. 11, p. 3928-3938.

Wouter M. Bergmann Tiest, "Tactual perception of material properties", Vision research, 2010, vol. 50, No. 24, p. 2775-2782.

Nicola Di Stefano et al., "Roughness perception: A multisensory/crossmodal perspective", Attention, Perception, & Psychophysics, 2022, vol. 84, No. 7, p. 2087-2114.

Heather Culbertson et al., "Modeling and rendering realistic textures from unconstrained tool-surface interactions", IEEE transactions on haptics, 2014, vol. 7, No. 3, p. 381-393.

Hideyuki Ando et al., "Nail-mounted tactile display for boundary/texture augmentation", Proceedings of the International Conference on Advances in Computer Entertainment Technology, 2007, p. 292-293.

Pornthep Preechayasomboon et al., "Haplets: Finger-worn wireless and low-encumbrance vibrotactile haptic feedback for virtual and augmented reality", Frontiers in Virtual Reality, 2021, vol. 2, No. 738613, p. 1-15.

Giovanni Spagnoletti et al., "Rendering of Pressure and Textures Using Wearable Haptics in Immersive VR Environments", 2018 IEEE Conference on Virtual Reality and 3D User Interfaces (VR), 2018, p. 691-692.

(56) References Cited

OTHER PUBLICATIONS

Eun Kwon et al., "Effects of sizes and shapes of props in tangible augmented reality", 2009 8th IEEE International Symposium on Mixed and Augmented Reality, 2009, p. 201-202.
Jason Hochreiter et al., "Cognitive and Touch Performance Effects of Mismatched 3D Physical and Visual Perceptions", 2018 IEEE Conference on Virtual Reality and 3D User Interfaces (VR), 2018, p. 379-386.
Qian Zhou et al., "Gripmarks: Using hand grips to transform in-hand objects into mixed reality input", Proceedings of the 2020 CHI Conference on Human Factors in Computing Systems, 2020, p. 1-11.
Mahdi Azmandian et al., "Haptic Retargeting: Dynamic Repurposing of Passive Haptics for Enhanced Virtual Reality Experiences", Proceedings of the 2016 CHI Conference on Human Factors in Computing Systems, 2016, p. 1968-1979.
Kening Zhu et al., "Haptwist: Creating interactive haptic proxies in virtual reality using low-cost twistable artefacts", Proceedings of the 2019 CHI Conference on Human Factors in Computing Systems, 2019, p. 1-13.
S. Asano et al., "Toward quality texture display: vibrotactile stimuli to modify material roughness sensations", Advanced Robotics, 2014, vol. 28, No. 16, p. 1079-1089.
Claudio Pacchierotti et al., "Wearable haptic systems for the fingertip and the hand: taxonomy, review, and perspectives", IEEE transactions on haptics, 2017, vol. 10, No. 4, p. 580-600.
Olivier Bau et al., "Revel: tactile feedback technology for augmented reality," ACM Transactions on Graphics (TOG), 2012, vol. 31, No. 4, Article 89, p. 1-11.
Shuhei Asano et al., "Toward augmented reality of textures: Vibrotactile high-frequency stimuli mask texture perception to be rougher or smoother?", 2013 IEEE International Conference on Systems, Man, and Cybernetics, 2013, p. 510-515.
Shunsuke Yoshimoto et al., "Material roughness modulation via electrotactile augmentation", IEEE Transactions on Haptics, 2015, vol. 8, No. 2, p. 199-208.
Tomosuke Maeda et al., "Wearable haptic augmentation system using skin vibration sensor", Proceedings of the 2016 Virtual Reality International Conference, 2016, p. 1-4.
Roberta Etzi et al. "Textures that we like to touch: An experimental study of aesthetic preferences for tactile stimuli", Consciousness and Cognition, 2014, vol. 29, p. 178-188.
Shuhei Asano et al., "Vibrotactile stimulation to increase and decrease texture roughness", IEEE Transactions on Human-Machine Systems, 2014, vol. 45, No. 3, p. 393-398.
Julien van Kuilenburg et al., "A review of fingerpad contact mechanics and friction and how this affects tactile perception", Proceedings of the Institution of Mechanical Engineers, Part J: Journal of engineering tribology, 2015, vol. 229, No. 3, p. 243-258.
Susan J. Lederman et al., "Fingertip force, surface geometry, and the perception of roughness by active touch", Perception & psychophysics, 1972, vol. 12, p. 401-408.
Tomosuke Maeda et al., "Fingeret: A wearable fingerpad-free haptic device for mixed reality", Proceedings of the 2022 ACM Symposium on Spatial User Interaction, 2022, p. 1-10.
Mourad Bouzit et al., "The rutgers master ii-new design force-feedback glove", IEEE/ASME Transactions on mechatronics, 2002, vol. 7, No. 2, p. 256-263.

Velko Vechev et al., "Tactiles: Dual-mode low-power electromagnetic actuators for rendering continuous contact and spatial haptic patterns in vr", 2019 IEEE Conference on Virtual Reality and 3D User Interfaces (VR), 2019, p. 312-320.
Anusha Withana et al., "Tacttoo: A thin and feel-through tattoo for on-skin tactile output", Proceedings of the 31st Annual ACM Symposium on User Interface Software and Technology, 2018, p. 365-378.
Teng Han et al., "Hydroring: Supporting mixed reality haptics using liquid flow", Proceedings of the 31st Annual ACM Symposium on User Interface Software and Technology, 2018, p. 913-925.
Alex Mazursky et al., "Magnetio: Passive yet interactive soft haptic patches anywhere", Proceedings of the 2021 CHI Conference on Human Factors in Computing Systems, 2021, p. 1-15.
Shan-Yuan Teng et al., "Touch&fold: A foldable haptic actuator for rendering touch in mixed reality", Proceedings of the 2021 CHI Conference on Human Factors in Computing Systems, 2021, p. 1-14.
Seungmoon Choi et al., "Vibrotactile display: Perception, technology, and applications", Proceedings of the IEEE, 2013, vol. 101, No. 9, p. 2093-2104.
Paul Strohmeier et al., "Generating haptic textures with a vibrotactile actuator", Proceedings of the 2017 CHI Conference on Human Factors in Computing Systems, 2017, p. 4994-5005.
Ki-Uk Kyung et al., "Ubi-pen: a haptic interface with texture and vibrotactile display", IEEE Computer Graphics and Applications, 2008, vol. 29, No. 1, p. 56-64.
Joseph M. Romano et al., "Creating realistic virtual textures from contact acceleration data", IEEE Transactions on haptics, 2012, vol. 5, No. 2, p. 109-119.
Samuel B. Schorr et al., "Fingertip tactile devices for virtual object manipulation and exploration", Proceedings of the 2017 CHI conference on human factors in computing systems, 2017, p. 3115-3119.
Dapeng Chen et al., "Fw-touch: A finger wearable haptic interface with an mr foam actuator for displaying surface material properties on a touch screen", IEEE transactions on haptics, 2019, vol. 12, No. 3, p. 281-294.
Vibol Yem et al., "Wearable tactile device using mechanical and electrical stimulation for fingertip interaction with virtual world", 2017 IEEE Virtual Reality (VR), 2017, p. 99-104.
Seokhee Jeon et al., "Haptic augmented reality: Taxonomy and an example of stiffness modulation", Presence, 2009, vol. 18, No. 5, p. 387-408.
Taku Hachisu et al., "Augmentation of material property by modulating vibration resulting from tapping", International conference on human haptic sensing and touch enabled computer applications, 2012, p. 173-180.
Yujie Tao et al., "Altering perceived softness of real rigid objects by restricting fingerpad deformation", The 34th Annual ACM Symposium on User Interface Software and Technology, 2021, p. 985-996.
Mark Hollins et al., "Perceptual dimensions of tactile surface texture: A multidimensional scaling analysis", Perception & psychophysics, 1993, vol. 54, p. 697-705.
Mark Hollins et al., "Individual differences in perceptual space for tactile textures: Evidence from multidimensional scaling", Perception & Psychophysics, 2000, vol. 62, p. 1534-1544.

* cited by examiner

WEARABLE HAPTIC DEVICES FOR MODULATING PERCEIVED ROUGHNESS OF PHYSICAL SURFACES IN REAL-TIME SIMULATION IN MIXED REALITY ENVIRONMENTS

FIELD OF THE INVENTION

The present invention generally relates to the visual simulation fields. More specifically the present invention relates to the technologies of modulating haptic in accordance with mixed reality simulations.

BACKGROUND OF THE INVENTION

Understanding the textural properties of material surfaces, such as roughness, stiffness, and temperature, is fundamental for human interaction with the physical world. While our skin can directly sense these properties through touch, replicating these tactile sensations in virtual reality (VR) and mixed reality (MR) remains a challenge. Various haptic devices and skin-integrated interfaces have been developed for users to interact with virtual objects and feel their tactile features in VR. Roughness, a critical factor in real-world texture perception, is often simulated using vibrotactile stimuli on users' hands. However, implementing these VR-centric vibrotactile stimuli in MR environments, where virtual content is overlaid onto the physical world, presents challenges. In MR, physical objects could serve as interactive haptic proxies to enhance user experience and task performance.

While the virtual-physical shape matching could be achieved by digital fabrication (e.g., 3D printing), it may be inefficient to fabricate fine surface textures, such as different surface roughness, on the physical proxies for the virtual objects with the same shape but different surfaces. For instance, it might not be cost-effective to 3D-print multiple physical copies of the virtual screws with the same size but different lead distances. Considering the reusability of physical haptic proxies, it would be helpful to use one or fewer physical objects to support the haptic experience of multiple virtual objects with the same physical dimension, but perhaps different textured surfaces. Directly applying vibrotactile stimuli on physical proxies can modify the perceived textures, but this approach requires mounting the vibrators on the physical materials. This limitation hinders the scalability and wearability of the haptic interface, as stated in Pacchierotti et al.'s study on wearable haptic devices. Therefore, it is important to be able to augment or modify the tactile texture sensation of the physical object through a wearable haptic interface for MR interaction.

Previous attempts to enrich the touch experience of virtual objects involve altering the perceived haptic sensations of physical objects through wearable devices. Vibrotactile feedback, a common method, has been used to increase perceived roughness. For instance, Asano et al. utilized a ring-based haptic device to introduce varying frequency vibrations to physical materials, resulting in an augmented sense of roughness. Electrotactile stimulus has also demonstrated support for increasing perceived roughness on real object surfaces for fingerpad-free exploration.

Currently, most of the previous work related to roughness modulation through wearable devices has focused on roughness increasing. Roughness decreasing is another equally important direction of roughness modulation, but it has received relatively less investigation and may not be trivial. For instance, Asano et al. deployed a high-frequency on-finger vibrotactile stimulus before the user touched the surface to suppress the skin perceived stimuli of the surfaces, allowing perceived roughness reduction on physical material surfaces. This is because the high-frequency on-finger vibration may reduce the sensitivity of the tactile receptors on the skin. It is clear that Asano et al. introduced a pre-intervention on skin stimuli reception to arouse haptic fatigue so as to reduce the further perceived roughness. However, this approach introduced additional haptic stimuli before the user's actual surface interaction, potentially leading to an obtrusive interaction experience.

Another potential solution for roughness modulation is ultrasonic vibration, particularly for reducing the touch sensation of bumpy textures on physical surfaces. However, existing approaches involve mounting the ultrasonic transducer on the material sample, limiting scalability and wearability crucial for haptic interfaces.

Therefore, in order to simultaneously increase or reduce the perceived roughness of physical surfaces for mimicking texture properties of material surfaces in real-time cooperation with mixed reality or visual reality devices, the field is still actively searching for a collaborative haptic device, and the present invention addresses this need.

SUMMARY OF THE INVENTION

It is an objective of the present invention to provide device, system, or method to solve the aforementioned technical problems.

In accordance with a first aspect of the present invention, a wearable haptic modulation device for real-time simulation of texture properties of a material surface in a mixed reality environment is provided. The wearable haptic modulation device includes a U-shaped pneumatic actuator, configured to surround a fingertip of a user; a finger-housing support, configured to create a space for containing the fingertip; a resonant actuator, positioned on the finger-housing support to generate a vibrotactile feedback for increasing a perceived roughness of a touched physical surface; and a pneumatic control system, configured to generate a pneumatic actuation and connected to the U-shaped pneumatic actuator and the resonant actuator. Specifically, the U-shaped pneumatic actuator exposes the fingerpad of the fingertip, so that the user's fingerpad directly contacts with the touched physical surface.

In accordance with one embodiment of the present invention, the U-shape pneumatic actuator is inflatable so as to lift the fingerpad and decrease the perceived roughness of the touched physical surface.

In accordance with one embodiment of the present invention, the U-shape pneumatic actuator is driven and inflated by the pneumatic control system in accordance to the pneumatic actuation.

In accordance with another embodiment of the present invention, the pneumatic control system comprises a microcontroller, a wireless communication module, an audio amplifier, an air pressure sensor, a motor driver, a battery and a vacuum pump.

In accordance with one embodiment of the present invention, the resonant actuator is electronically connected with a computing device and a camera, wherein the camera captures an object-touching action of the user's finger and the computing device calculates a velocity of the finger's movement, so that the computing device generates a vibrotactile signal to the resonant actuator for generating the vibrotactile feedback.

In accordance with one embodiment of the present invention, the U-shaped pneumatic actuator is a multilayer structure with an inflatable non-cured chamber for air-filling.

In accordance with a second aspect of the present invention, a method of utilizing the aforementioned wearable haptic modulation device for real-time modulation of perceived roughness in cooperation with a mixed reality system is provided. Particularly, the method includes detecting an object-touching action of a user through a camera involved in the mixed reality system as a trigger to initiate a roughness-modulation process. It is worth noting that the roughness-modulation process includes a roughness decrease aspect and a roughness increase aspect.

In accordance with one embodiment of the present invention, the roughness decrease aspect includes inflating the U-shape pneumatic actuator to reduce a finger-surface contact area.

In accordance with one embodiment of the present invention, the roughness increase aspect includes providing the vibrotactile feedback through the resonant actuator.

In accordance with a third aspect of the present invention, a mixed reality system is introduced. Specifically, the system includes the aforementioned wearable haptic modulation device.

BRIEF DESCRIPTION OF THE DRAWINGS

Embodiments of the invention are described in more details hereinafter with reference to the drawings, in which:

FIGS. 2A-2B depict a schematic diagram showing the principle of reducing contact area through pneumatic actuation, in which FIG. 2A shows an inactivated pneumatic actuator and FIG. 2B exhibits an activated pneumatic actuator;

FIGS. 6A-6C depict the FEM analysis of the U-shaped pneumatic actuator, in which FIG. 6A shows the simulated and experimental data, FIG. 6B displays the static deformation under 6 kPa, and FIG. 6C exhibits the stress distribution under 6 kPa;

FIG. 8C shows the selected six testing materials and baseline material;

DETAILED DESCRIPTION

Figure 1A:
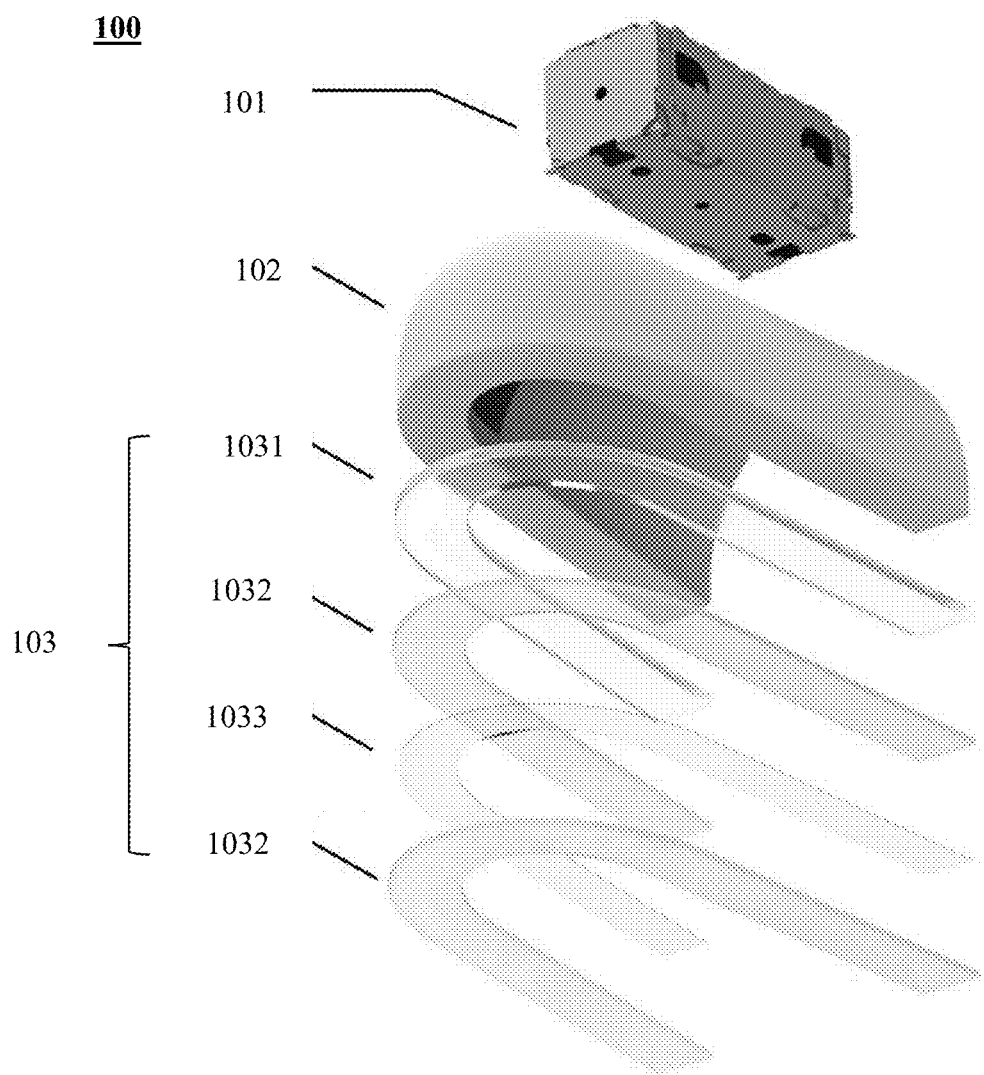
FIGS. 1A-1B depicts a schematic diagram showing the structure of the wearable haptic modulation device, in which FIG. 1A show the integration of a linear resonant actuator, a housing support, a U-shaped pneumatic actuator and FIG. 1B displays the pneumatic control system.

In the following description, devices, systems, and/or methods of modulating perceived roughness in real time cooperating with mixed reality devices and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

As used herein, the term "haptic modulation" refers to present synthetic signals generated from haptic actuators to alter the physical haptic properties of real materials. One major feature of haptic modulation is to alter the perceived roughness of real-world materials to create the haptic sensations of new materials. As used herein, the term "roughness" refers to a human haptic sensation about a physical surface, roughness is one of the most important features for haptic exploration and discrimination on material-textured surfaces.

As used herein, the term "skin-contact area" refers to a contact area between the fingerpad and a textured surface. The skin-contact area is positively proportional to the applied normal force, which in turn is positively correlated with roughness. Namely, the reduction of the skin-contact area can lead to the reduction of the applied normal force and further reduce the perceived roughness.

As used herein, the term "vibrotactile feedback" refers to providing rich tangible vibrations to simulate the surface textures during the interaction between skin area and physical objects. It is known that tool-mediated texture exploration for roughness perception, providing different roughness experiences via frequency and amplitude adjustments.

In accordance with a first aspect of the present invention, a wearable haptic modulation device for real-time simulation of texture properties of a material surface in a mixed reality environment is provided. The device consists of a U-shaped pneumatic actuator that comfortably encircles the fingertip of the user, providing a unique and ergonomic design. A finger-housing support creates a space for the fingertip, ensuring direct contact with the touched physical surface by not covering the fingerpad, this way, exposing the fingerpad to interact with a surface. This design enhances the realism of the haptic experience. The device is equipped with a resonant actuator strategically positioned on the finger-housing outer and upper surface. The resonant actuator generates vibrotactile feedback, contributing to an increased perceived roughness of the touched physical surface. The control of the device is managed by a sophisticated pneumatic control system, which includes components such as a microcontroller, a wireless communication module, an audio amplifier, an air pressure sensor, a motor driver, a battery, and a vacuum pump. It is worth noting that the pneumatic control system, configured to generate a pneumatic actuation and connected to the U-shaped pneumatic actuator and the resonant actuator.

Additionally, the wearable haptic modulation device incorporates advanced features for precise interaction within a mixed reality environment. The resonant actuator is electronically connected to a computing device and a camera. The camera captures the user's object-touching action, and the computing device calculates the velocity of the finger's movement. This information is then used to generate a vibrotactile signal sent to the resonant actuator, enhancing the realism of the haptic feedback. Furthermore, the U-shaped pneumatic actuator can be inflated to lift the fingerpad, reducing the perceived roughness of the touched physical surface. The multilayer structure of the U-shaped pneumatic actuator includes an inflatable non-cured chamber for efficient air-filling. Particularly, the U-shape pneumatic actuator is driven and inflated by the pneumatic control system in accordance to the pneumatic actuation.

The wearable haptic modulation device adopting a pneumatic actuator around the fingerpad without blocking the skin, reducing perceived roughness through unobtrusive pneumatic actuation without additional artificial haptic stimuli (e.g., vibrotactile stimuli) before touch interactions. It is worth noting that the wearable haptic modulation device directly modulates the perceived sensation without any artificial haptic stimuli on user's hand or the to-be-touched surface before the touch action for arousing haptic fatigue.

In accordance with a second aspect of the present invention, a method of utilizing the aforementioned wearable haptic modulation device for real-time modulation of perceived roughness in cooperation with a mixed reality system is provided. The process commences by detecting an object-touching action performed by a user, and this action is identified through the camera integrated into the mixed reality system. The camera captures the intricate details of the user's finger interaction with virtual or physical objects, serving as a trigger for the initiation of the roughness-modulation process.

This modulation process is designed to encompass both a roughness decrease aspect and a roughness increase aspect, contributing to a dynamic and versatile haptic experience. In the roughness decrease aspect, the U-shaped pneumatic actuator comes into play. This actuator, when inflated, strategically reduces the contact area between the user's finger and the touched physical surface. This deliberate reduction in contact area results in a perceptible decrease in the roughness experienced by the user, adding a layer of realism to the haptic feedback.

Conversely, in the roughness increase aspect, the resonant actuator comes in. This component is responsible for providing vibrotactile feedback that intricately enhances the perceived roughness of the touched physical surface. The resonant actuator is electronically connected to a computing device, which, in turn, communicates with the camera. The camera captures the object-touching action, and the computing device calculates the velocity of the finger's movement. Based on this data, a precise vibrotactile signal is generated and transmitted to the resonant actuator, intensifying the haptic feedback in a manner that aligns with the user's actions.

This method thus ensures a nuanced and immersive haptic experience in mixed reality environments, offering users the ability to interact with virtual and physical objects with heightened realism and responsiveness.

In accordance with a third aspect of the present invention, a mixed reality system including the aforementioned wearable haptic modulation device is provided.

EXAMPLES

Example 1. A Wearable Haptic Modulation Device

In this example, an index-finger-worn haptic modulation device is provided. The device utilizes both vibrotactile and pneumatic feedback to increase or reduce the perceived roughness of physical surfaces while preserving other haptic sensations such as temperature, stickiness, and stiffness, achieving psychological effects of roughness modulation for users.

Figure 1B:
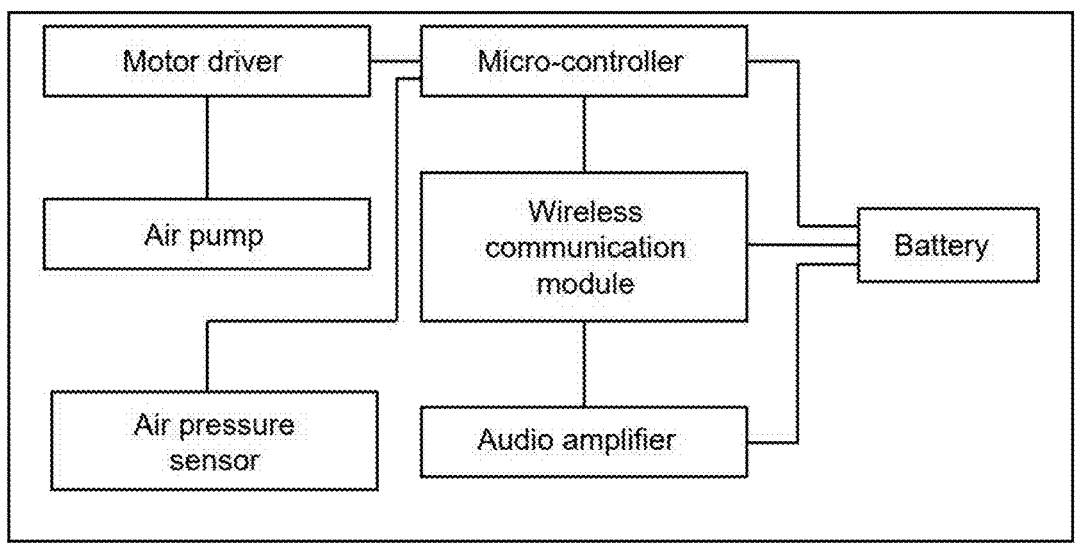

As shown in FIGS. 1A-1B, the index-finger-worn haptic modulation device 100 includes a linear resonant actuator 101, a housing support 102, a U-shaped pneumatic actuator 103 and a pneumatic control system 104, and the pneumatic control system is connected to the linear resonant actuator 101 and the U-shaped pneumatic actuator 103 (not shown). The housing support 102 is a 3D-printed semi-transparent housing, and the U-shaped pneumatic actuator 103 is a multilayer construction. Particularly, it includes a layer of Polydimethylsiloxane (PDMS) film 1031, a layer of polyethylene terephthalate (PET) film 1033 sandwiched between two layers of silicone rubber (EcoFlex 00-30) film 1032, so that there is a non-cured chamber between the two layers of silicone rubber film that is inflatable with different volumes of air pumping.

The pneumatic control system 104 includes, but not limited to, microcontroller, air pressure sensor, audio amplifier, Bluetooth module, motor driver, battery, and pump. The system 104 captures the velocity of the index finger sliding on the physical surface using a top-view camera (not shown) and generates real-time vibrotactile stimuli with varying frequencies and amplitudes to increase the perceived roughness.

The U-shaped pneumatic actuator 103 is a hollow pneumatic actuator around the fingerpad to reduce the perceived roughness of the physical surface by lifting the fingertip after inflation, decreasing the contact area between the user's fingerpad skin and the physical surface. It is worth noting that the U-shape pneumatic actuator 103 around the edge of the fingerpad but does not fully cover it, allowing for fingerpad-free interaction. Consequently, the user's fingerpad is exposed and left free to perceive the haptic sensation of the original physical surface, as the user may need to switch interacting with physical and virtual objects in MR.

Figure 2A:
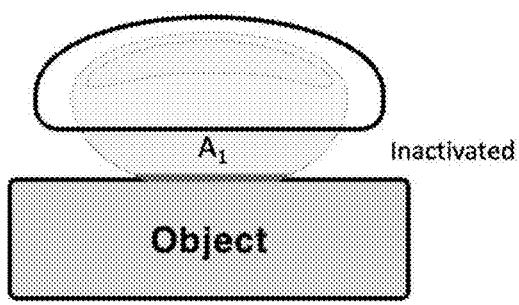
Figure 2B:
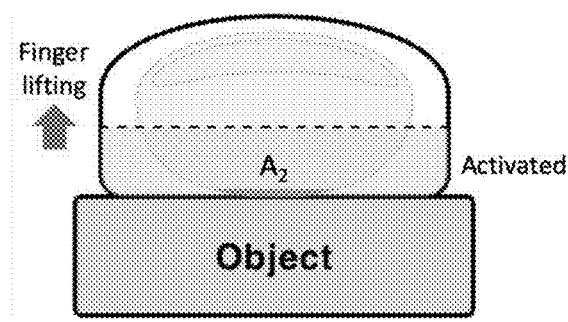

As shown in FIGS. 2A-2B, the U-shaped pneumatic actuator 103 can be inflated to lift the fingerpad. When the U-shaped pneumatic actuator 103 is activated (FIG. 2B), it lifts the fingertip and causes a decrease in the contact area (A2) compared to the contact area (A1) when the actuator is inactive (FIG. 2A).

Silicone is used as the medium in contact with the physical textured surface for the U-shaped pneumatic actuator 103. Additionally, it is covered with an additional layer of Polydimethylsiloxane (PDMS), which is a silicone elastomer, on the U-shaped pneumatic actuator 103 to make its upper layer expandable and for easy assembly with a 3D-printed housing support through silicone adhesive.

The linear resonant actuator 101 is installed on the top of the housing support 102 to generate vibrotactile feedback for perceived roughness increases. The concept of virtual wavy surface has been applied for virtual texture rendering and roughness modulation. Specifically, the pneumatic control system 104 utilizes the linear resonant actuator 101 to generate sinusoidal vibratory stimuli that are oriented parallel to the index finger for better perception based on the estimated finger velocity during the finger scanning on the textured surface. It is worth noting that humans have difficulty distinguishing the direction of high-frequency vibrations. The value of the driven voltage Y(t) is determined by the following equation:

$$Y(t) = A \sin\left(2\pi \frac{v(t)}{\lambda} + \phi\right);$$

where Y(t), A, v(t), and λ are the driven voltages, the vibratory amplitude, the velocity of the index finger movements on the material surface, and the wavelength of the rendered virtual surface, respectively. Herein, λ is set constant as 1.0 mm, and phase value φ is set as 0.

Figure 4:
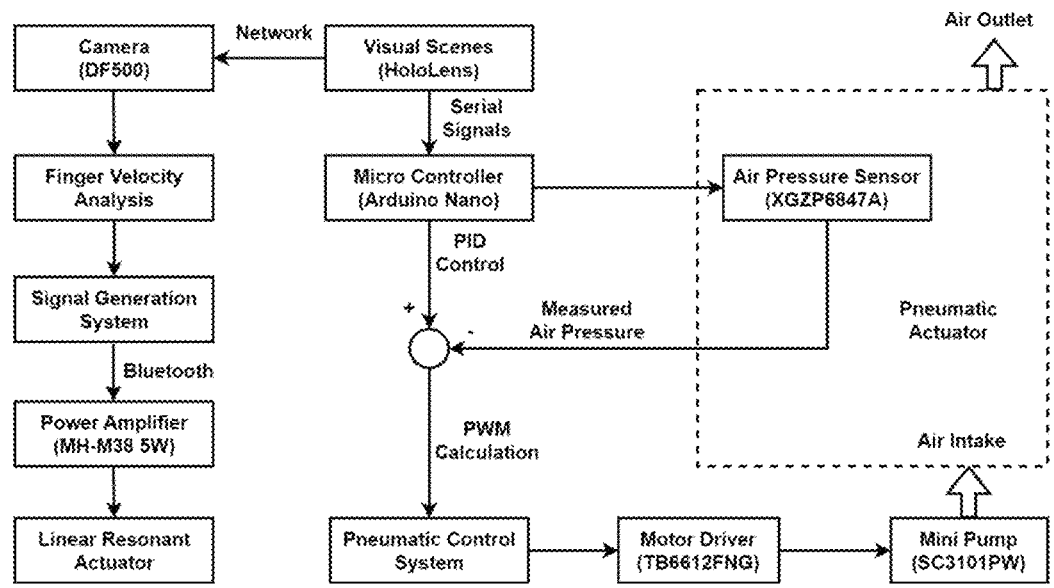
FIG. 4 depicts the workflow of the pneumatic-vibrotactile controller.

As shown in FIG. 4, the workflow of the pneumatic-vibrotactile controller 104 is demonstrated. A miniature vacuum pump (SC101PW, DC 3.0 V, 65 mA, 33.5 mm 10 mm 4 mm) is included in the pneumatic control system 104 as the air-pumping source. The system also includes an air-pressure sensor (XGZP6847A, CFSensor) with a sampling frequency of 20 Hz for the closed-loop pneumatic control. The air pump is controlled by an external motor-driver circuit (TB6612FNG) with a 3.7 V, 200 mAh lithium polymer battery. For the vibrotactile control, a power amplifier (5 W, M38) communicates with the computer through Bluetooth and drives the linear resonant actuator.

The MR application detects the object-touching action and triggers the roughness-modulation process. Specifically, for roughness decreases, taking the referenced air pressure as the set point and the measured air pressure reading of the air pressure sensor as the feedback, the micro-controller (Arduino Nano) controls the pneumatic pumping system to achieve and maintain the target air pressure in the pneumatic actuator. The top-view camera may capture the velocity of the index finger, and the computer generates the vibration signals and transmits the signals to the linear resonant actuator through the amplifier for vibrotactile rendering.

For instance, the MR scenarios using Unity3D 2019.4.39f with C# are developed and deployed on a HoloLens 2 device. OpenCV is used to detect the user's hand movements and calculate the velocity of the index finger, and the PyAudio library for the vibrotactile signal generation. Specifically, a hand-tracking algorithm is adopted based on OpenCV to extract the positions of hand landmarks with a sampling rate of 30 Hz and estimated the current velocity of the index fingertip under a 50 cm height distance between the top-view camera and the physical surface at 3000 Hz. Then, the current velocity values are mapped into the wave of driven voltages through a sine wave function and the vibrotactile signals are played as an audio sequence to drive the linear resonant actuator 101 with varying frequencies at a 1000 Hz frame rate. When the computer receives the control signals from HoloLens 2 (i.e., the trigger of hand-object contact), the pneumatic control system controls the linear resonant actuator and the pneumatic system to increase and decrease the perceived roughness of physical materials respectively.

Example 2. The Fabrication of U-Shaped Pneumatic Actuator

Figure 3:
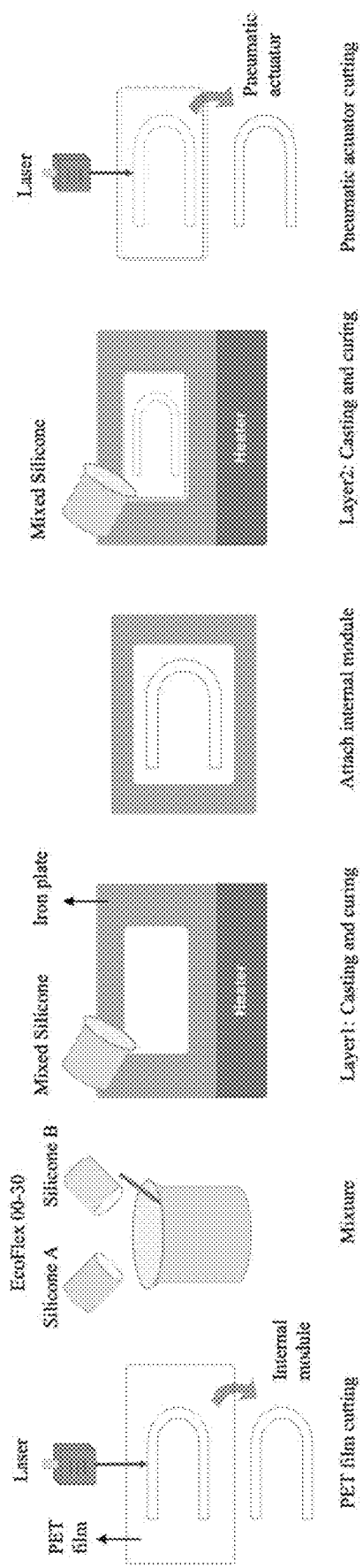
FIG. 3 depicts a flow chart of fabricating a U-shaped pneumatic actuator.

FIG. 3 illustrates the process of pneumatic actuator fabrication. To fabricate the pneumatic actuator, we first laser-cut a 40 μm thickness layer of transparent thermoplastic polyester (PET) film is laser-cut to obtain a U-shape internal module. Next, the two parts of liquid silicone rubber (Eco-Flex 00-30 A and B) are mixed with a 1:1 ratio and stirred for about a minute. The silicone mixture is poured onto an iron plate and a film applicator is used to spread the mixture to a thickness of 400 μm. The silicone is then heated for about 20 minutes to cure. After the silicone film is cured, the laser-cut U-shaped internal module is attached to the first layer of the dry silicone film. The casting and curing procedure are repeated again to create another layer of silicone film on top. This process creates a non-cured chamber between the two layers of silicone film that could be inflated with different volumes of air pumping.

Example 3. The Evaluation of Air Pressure Tracking

The wearable haptic modulation device's performance in generating different levels of air pressure in the U-shaped pneumatic actuator. Before testing, an uneven deformation on the pneumatic actuator is noticed when the air pressure is over 12 kPa, which may be due to the minor variance of the thicknesses across different parts of the actuator caused by the uneven heat distribution during the curing process.

Figure 5:
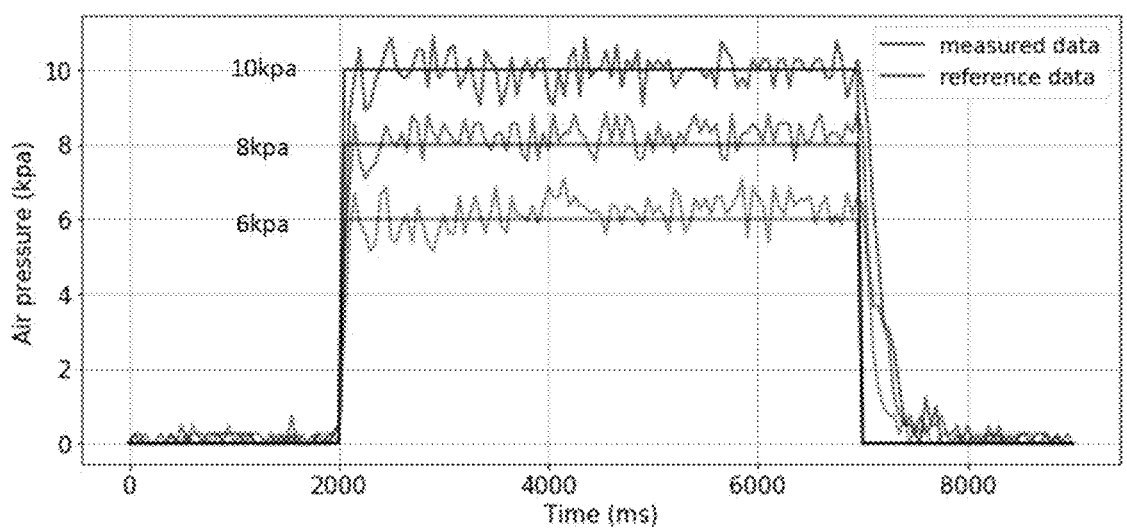
FIG. 5 depicts the air-pressure tracking results for the PID control system.

To this end, the step responses of target air pressure from 0 to 12 kPa with 1 kPa as the interval are measured with a total of 12 controlled pneumatic signals. The PID control algorithm is implemented with a sample period of 0.05s for real-time inflating and deflating. To demonstrate the system's air-tracking performance, FIG. 5 illustrates the step responses of the pneumatic control system to three air pressure (6, 8, and 10 kPa). The mean absolute errors (MAE) and the maximum measured errors (MME) of the air pressure-changing proportional stage (i.e. before reaching the target air pressure) and the stable stage (i.e. 5 s for maintaining the air pressure) are also calculated, respectively. The results show that the average MAE is 0.679 kPa and MME is 1.233 kPa in the proportional stage, 0.386 kPa for MAE and 0.990 kPa for MME in the stable stage. Table 1 shows all MAEs and MMEs of each reference air pressure (0-12 kPa).

TABLE 1

The MAE and MME values of different reference air pressure values

| Reference air pressure (kPa) | Proportional stage | | Stable stage | |
|---|---|---|---|---|
| | MAE (kPa) | MME (kPa) | MAE (kPa) | MME (kPa) |
| 1 | 0.48 | 0.91 | 0.48 | 0.88 |
| 2 | 0.61 | 1.18 | 0.39 | 0.94 |
| 3 | 0.45 | 0.97 | 0.38 | 0.91 |
| 4 | 0.45 | 1.10 | 0.40 | 1.11 |
| 5 | 0.23 | 0.74 | 0.34 | 1.12 |
| 6 | 0.51 | 0.86 | 0.41 | 1.09 |
| 7 | 1.04 | 1.31 | 0.31 | 0.89 |
| 8 | 0.70 | 1.14 | 0.38 | 0.85 |
| 9 | 0.98 | 1.12 | 0.43 | 1.08 |
| 10 | 0.72 | 1.20 | 0.35 | 0.97 |
| 11 | 1.00 | 2.2 | 0.40 | 1.12 |
| 12 | 0.99 | 2.07 | 0.37 | 0.92 |
| Average | 0.679 | 1.233 | 0.386 | 0.990 |

Example 4. The Structure Stability of the U-Shape Pneumatic Actuator

Figure 6A:
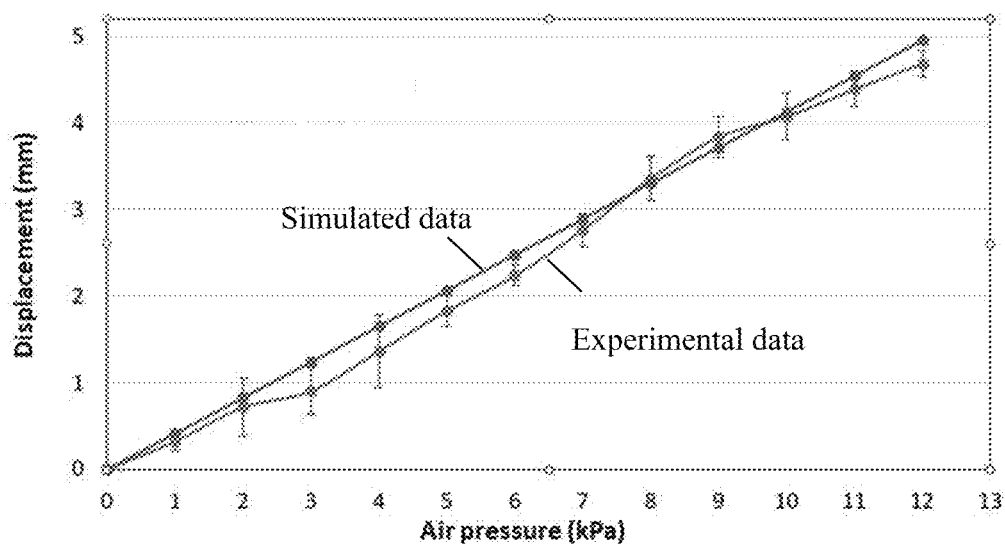
Figure 6B:
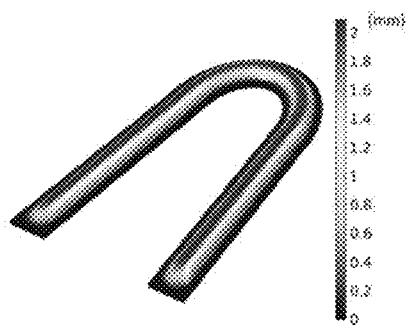
Figure 6C:
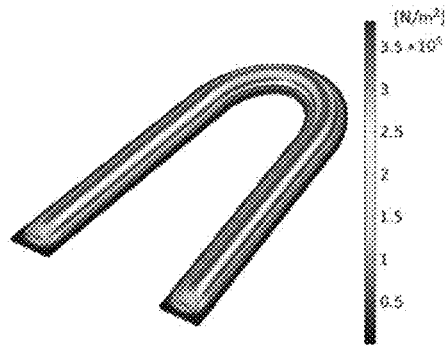

To evaluate the deformation of the U-shape pneumatic actuator, a 3D finite element model (FEM) is built in COMSOL Multiphysics 5.5 (COMSOL, Sweden) to simulate different levels of shape-changing under air pressures. The 3D model of the pneumatic actuator is restructured and simplified as a U-shape plate consisting of two layers of stretchable silicone film with a thickness of 400 μm (Ecoflex-30, Smooth-On, USA) and a set of pressure loading is applied in the actuator from 0 to 12 kPa. The elastic parameters of the silicone material (e.g., elastic modulus) are adjusted according to the deformation response from the measurement of the expanded distance, resulting in linear relations between the height distance and the air pressure, as shown in FIG. 6A. FIG. 6B shows that the maximum deformation of the pneumatic actuator is evenly distributed in the middle of the pneumatic channel, implying that fingers can be lifted smoothly. FIG. 6C shows that the distribution of stress is continued from the middle to the edge of the pneumatic tube during deformation. The deformation and the stress directions are perpendicular and tangent to the U-shape surface, respectively. Moreover, FIGS. 6A-6C also show the experimental measurement of the lifted distances in the real pneumatic tube under different air pressure, indicating that the controller system can closely follow the simulation.

Example 5. The Reduced Finger-Surface Contact Area Level

Figure 7A:
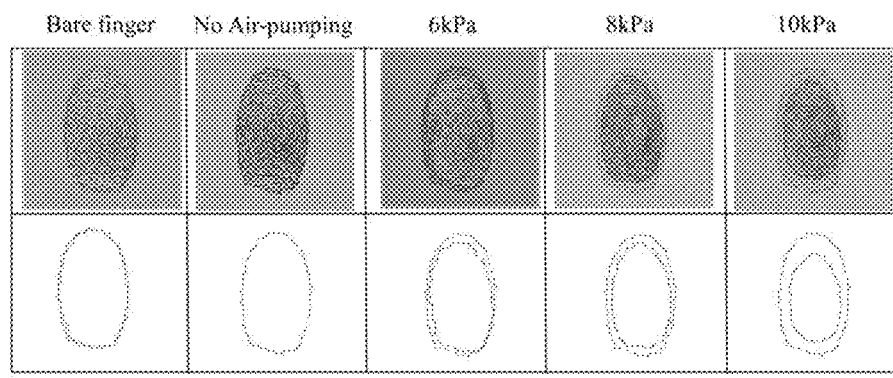
FIGS. 7A-7C depict one participant's fingerprints under different applied normal forces, which are 0.75 N (FIG. 7A), 1.0 N (FIG. 7B) and 1.5 N (FIG. 7C), respectively.
Figure 7B:
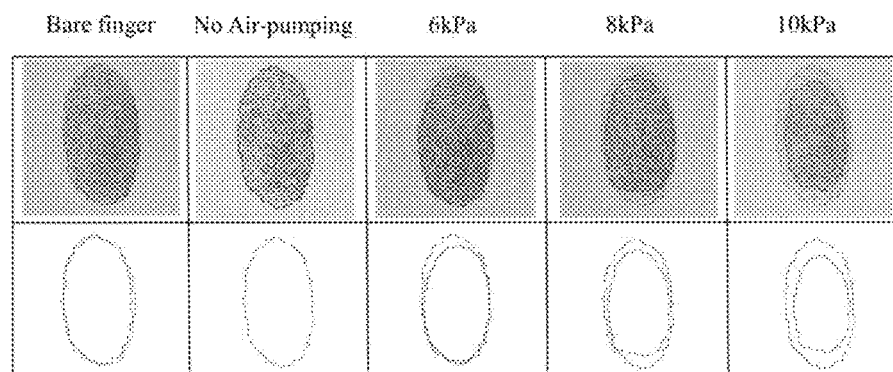
Figure 7C:
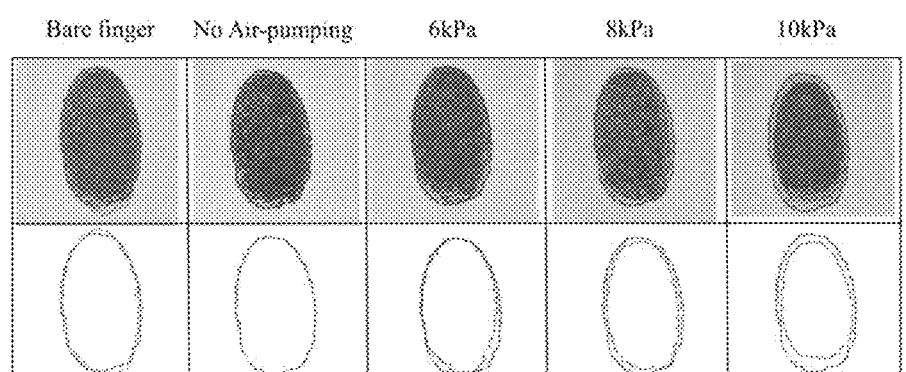

By lifting the fingerpad, the device can potentially reduce the contact area between the user's fingerpad and the physical textured surface. To this end, three participants are recruited to wear the device on their index fingers and press their fingertips on a paper surface with an applied force of roughly 0.75 N, 1.0 N, and 1.5 N. Their fingerprints with ink on an ergometer (DS2-5N, PUYAN) are collected and three different air-pumping pressures: 6 kPa, 8 kPa, and 10 kPa, are tested to compare their finger-surface contact areas with that of no air-pumping stimuli. FIGS. 7A-7C shows the images of one participant's fingerprints with the edge lines under different applied normal forces.

The pixel numbers of each image of fingerprints are calculated and the ratio of contact areas with/without pneumatic stimuli is investigated. The results indicate that the ratio of reduced contact area increases as the air pressure increases and the normal force decreases. Specifically, the average values of the ratio of reduced contact area are as follows: 8.1% (SD=2.15%) for 6 kPa, 11.9% (SD=3.18%) for 8 kPa, and 20.8% (SD=2.62%) for 10 kPa at a normal force of 1.5 N; 8.6% (SD=4.46%) for 6 kPa, 15.2% (SD=3.20%) for 8 kPa, and 28.8% (SD=6.12%) for 10 kPa at normal force of 1.0 N; and 12.8% (SD=3.67%) for 6 kPa, 25.5% (SD=2.55%) for 8 kPa, and 39.6% (SD=3.79%) for 10 kPa in the 0.75 N normal force condition.

Example 6. The Investigations in Latency, Noise, and Power Consumption

The controller's response time is also measured. The results reveal an average activation time of 145.83 ms (SD=39.65) and 329.17 ms (SD=94.05) for deactivation, suggesting a real-time performance as shown in FIG. 5. The latency of vibrotactile feedback is approximately 53.53 ms (SD=8.32) under the refreshing rate of 30 Hz refresh rate for the process of hand-motion tracking and velocity estimation with a Dell i5 CPU. To assess the noise level of the device, a sound-level meter is placed at a distance of about 40 cm from the device, simulating the approximated distance between the user's wrist and ear in usage. The measured noise levels are about 51.0 dB for 6 kPa, 56.9 dB for 8 kPa, and 59.0 dB for 10 kPa control signals, with the ambient noise level at approximately 38.9 dB. The device is powered using a 200 mAh, 3.7V LiPo battery. The highest current is about 60 mA (0.2 W) for 10 kPa pneumatic actuation and the highest power consumption for vibratory is about 2 W under 6.2 m/s$^2$ acceleration signals in 250 Hz. Therefore, the maximum total power consumption of the current system is about 2.2 W, which can support approximately 19 minutes of continuous tactile feedback.

Example 7. User-Perception Experiments of Modulating Surface Haptic Properties by the Device A user-perception experiment is conducted to investigate how the haptic modulation device can alter users' perception of surface haptic sensations on different materials. All five psychophysical dimensions of haptic interaction are considered, namely roughness, flatness, temperature, stickiness, and stiffness. Noted that the perceived roughness of the material surface is mediated by the vibrational cues (spatial periods smaller than 200 μm) for fine roughness and spatial cues for flatness or macro roughness (spatial periods exceeding 200 μm). In terms of subjective representation, the flatness is perceived and represented by the "uneven" label, and the fine roughness is mainly described as "rough". It is hypothesized that the perceived roughness or flatness of the textured surfaces might be increased through the device's vibrotactile feedback, and decreased due to the reduction of finger-surface contact area and applied normal force on the surface, through the pneumatic actuation. Furthermore, how the haptic modulation device may affect the users' perception of other psychophysical haptic dimensions (i.e., temperature, stickiness, and stiffness) is also studied.

Twelve participants (five females and seven males) from a local university are recruited, all of whom are right-handed and have no prior experience with wearable haptic interfaces. The participants have an average age of 29.1 years old (SD=3.03), and the average width of the distal interphalangeal (DIP) of their dominant index fingers is 14.9 mm (SD=1.33). A power analysis is conducted, suggesting that the estimated sample size of 12 with an 89.2% chance of perceiving different levels of roughness among different haptic stimuli at the 0.05 significance level. The experiment protocol is approved by the ethical board of the university.

Figure 8A:
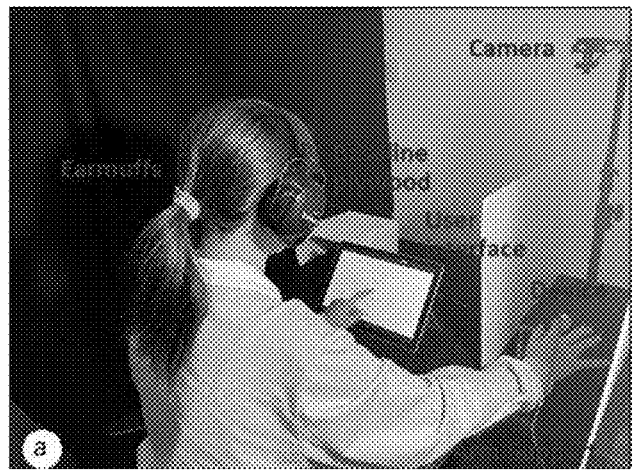
FIGS. 8A-8C depict the setup and the material in user-perception experiments, in which FIG. 8A demonstrates a setup of the experiment environment, FIG. 8B displays a user interface.
Figure 8B:

FIG. 8A illustrates the setup of the experiment environment, including the haptic modulation device, a tablet for showing the graphical user interface (FIG. 8B) and recording the participants' rating responses. The participant wore the haptic modulation device on his/her dominant hand which is placed behind a large cardboard to avoid visual bias. An arm support is fixed on the table, to reduce possible fatigue during the experiment. The participant also wears a pair of earmuffs to avoid auditory bias. A top-view camera (5 MP, 30 fps, JERRY, CHINA) is installed at the height of 50 cm and captured the index-finger motion for velocity calculation.

Figure 8C:
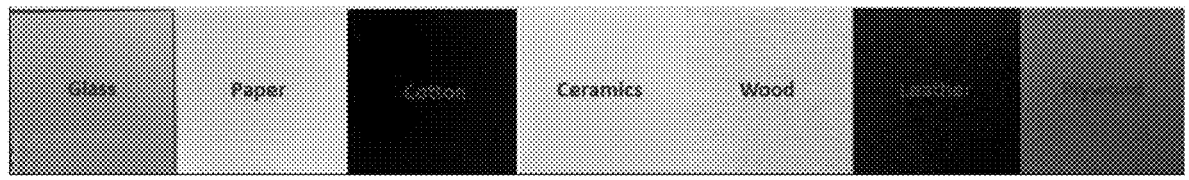

Seven different materials (glass plate, ceramics plate, paper, plywood, balsa wood, taurillon leather, and cotton, as shown in FIG. 8C) are selected for this user-perception experiment, to investigate how the device alters users' haptic perception on these materials. For these materials, four materials (leather, paper, wood, and cotton) are first selected for roughness/texture modulation. To balance the range of roughness, two smoother materials (glass and ceramics) are added and plywood material with medium roughness is chosen. All the material samples are cut into the size of 10 cm×10 cm with a thickness of 2 mm, and placed on a 10 cm height acrylic shelf.

The set of haptic stimuli for the device includes three types of vibrotactile stimuli, three types of pneumatic stimuli, and one condition with no stimuli, for a total of seven types of stimuli. The three amplitude levels of vibrotactile stimuli corresponded to 3.7, 4.9, and 6.2 m/s$^2$ acceleration at 250 Hz, are denoted as the stimuli A1, A2 and A3, respectively. Higher amplitude tends to yield rougher perception when the user scans his/her finger on a textured surface. Besides, three different levels of air pressure for pneumatic actuation (6 kPa, 8 kPa, and 10 kPa) are selected, where the corresponding fingerpad-lifting distances are averagely 2.24 mm (SD=0.121), 3.36 mm (SD=0.258) and 4.07 mm (SD=0.274). These stimuli are denoted as stimuli B1, B2, and B3, respectively.

Before the experiment started, all the participants are asked to rank the perceived roughness levels of these seven materials (i.e., 1 for the smoothest and 7 for the roughest) with only their bare fingers touching the surfaces wearing no devices. The results show that glass is consistently ranked as the smoothest, and over 80% of the participants rank leather as the roughest, with plywood always ranked as the fourth smooth/rough material out of seven. Hence, plywood is chosen as a baseline material, and the other six types of materials as the testing materials. That is, the participant is instructed to rate their perceived roughness compared to their non-instrumented perception of plywood roughness, which indicates the center position of the rating slider in the graphical user interface on the tablet.

The experiment is designed as followed. A within-subject factorial design with two independent variables, the type of haptic stimuli (i.e., vibrotactile stimuli, pneumatic stimuli and the no-stimulus situation) and the material type, is employed. As the dependent variables, the participants' subjective ratings of the perceived intensity of the aforementioned five psychophysical dimensions under each type of haptic stimuli on each tested material are recorded. In each trial, a haptic stimulus (i.e., vibrotactile or pneumatic stimulus) lasted for 5 seconds followed by a 5-second resetting period for the skin to return to the neutral status. Including the time that the participant spends on ratings, the actual break lasts for around 20 seconds before the next trial. Noted that there are no visual and auditory cues during the stimuli for the participant. The tablet screen in front of the participant displays the countdown process and presents the five sliders after each stimulus. The participant is allowed to move the slider to rate his/her perceived intensity on a continuous scale (1.00-100.00) for the five psychophysical haptic dimensions, with 1.00 indicating the lowest level and 100.00 as the highest level. The slider is initially placed in the middle (50.00 out of 100.00) of the scale which represents the sensation of the baseline material (i.e., plywood). Each participant performs the experiment in one sitting posture, including breaks. Each stimulus is repeated five times, and the first time is treated as a training session without collecting data. Six testing materials (i.e., glass, paper, cotton, ceramic, wood and leather) are presented in a Latin-square-based counterbalanced order, and all the stimuli signals are presented in a random order for each material. In total, each participant has done a total of 6 materials×7 stimuli×5 repetitions=210 trials. The total experimental time lasts less than 2 hours.

Following a common procedure of "Introduction-Pre-questionnaire-Training-Testing", the experiment involves one experimenter and one participant with two sessions: one training session and one experimental session. The training session is the same as the experimental session without data recording. The experiment starts by introducing the process of the experiment, after which the participant is seated in a comfortable position and finishes a pre-questionnaire about the demographic information. The participant needs to wash their hands with soap and dry them with a towel to ensure normal tactile perception on his/her bare fingerpad before the experiment. Then the experimenter measures the width of the DIP joint of the index finger on the participant's dominant hand and assigned a fitting size of 3D-printed housing to the participant for wearing the device.

During the experiment, the participant is required to gently move the fingertip from side to side and tries to maintain the sliding speed of about 50 to 200 mm/s and normal pressure of about 0.3 to 1.2 N as much as possible for clear texture perception on each textured surface. Before testing, the participant can practice his/her sliding movement with the aforementioned speed and pressing force range as much as possible, until s/he self-reports that s/he is ready for the experiment. The baseline stimulus is presented to the participants after every six trials. Noted that the participant may feel the texture of the baseline material (plywood) anytime when s/he demands. Between every two types of material, the participant is instructed to take off the device for a 3-minute compulsory rest.

Taking the stimuli and material types as independent factors, a two-way repeated-measures ANOVA is performed on the participants' ratings of perceived roughness among all the testing materials. Initially, Mauchly's Sphericity Test is conducted and a violation of the sphericity ($p<0.05$) is shown, so the Greenhouse-Geisser correction is applied to adjust the Degrees of Freedom. It is found that both the haptic stimuli (F (1.47,15.475)=79.502, $p<0.0001$, $\eta^2_p=0.878$) and the material types (F (2.225,24.477) =64.279, $p<0.0001$, $\eta^2_p=0.854$) have a statistically significant effect on the subjective rating values. Additionally, no significant interaction effect is found between these two factors. In terms of different stimuli within each material, post-hoc pairwise comparison reveals significant differences in the user-rated values between almost all the pairs of stimuli and no stimuli conditions ($p<0.05$). In general, the material is perceived as rougher under the vibrotactile stimuli, with the roughness rating increasing with the amplitude level, and smoother under the pneumatic stimuli (i.e., the higher the air pressure, the smoother it is rated). Table 2 shows the detailed results of pairwise comparisons with Bonferroni correction for each condition and Table 3 shows the mean and SD values of participants' subjective rating levels of perceived roughness. These results suggest that the participants can perceive a range of roughness levels based on psychophysical dimensions, both increases and decreases, modulated by the device under different stimuli.

TABLE 2

Details of stimuli factor's effect on roughness and flatness per material (the ">" indicates the significant difference with p < 0.05 with Bonferroni correction, and the "~" indicates no-significant difference).

| | Roughness Stimuli | Flatness Stimuli |
|---|---|---|
| Glass | A2~A3 > A1 > N~B1~B2~B3, A2~A1, A2 > N, A1 > B1 B1~B3, N > B2/B3 | A3 > A2~A1 > N~B1~B2~B3 A2 > N, A3 > A1, N~B1/B2/B3, B1~B3, A1 > B1/B2/B3 |

TABLE 2-continued

Details of stimuli factor's effect on roughness and flatness per material (the ">" indicates the significant difference with p < 0.05 with Bonferroni correction, and the "~" indicates no-significant difference).

| | Roughness Stimuli | Flatness Stimuli |
|---|---|---|
| Ceramics | A2~A3 > A1 > N~B1 > B3~B2<br>A2~A1, A2 > N, A1 > B1,<br>B1 > B2, N > B2/B3 | A3~A2 > A1 > N~B1~B2~B3<br>A3 > A1, A2 > N, N~B1/B2/B3,<br>A1 > B1/B2/B3, B1~B3<br>A3 |
| Paper | A3 > A2 > A1 > N~B1~B2 > B3<br>A1 > B1/B2, N > B2/B3, B1 > B3 | ~A2~A1 > N~B1~B2~B3<br>A3~A1, A2 > N, B1~B3,<br>A1 > B1/B2/B3, N~B1/B2/B3 |
| Wood | A3~A2 > A1 > N > B1~B2 > B3,<br>A3 > A1, A2 > N, N > B2/B3, B1 > B3 | A3~A2~A1 > N~B1~B2~B3<br>A3/A2 > N, A3~A1, N~B2/B3,<br>B1~B3, A1 > B2/B3 |
| Cotton | A3~A2 > A1~N > B1 > B2~B3<br>A3 > A1/N, A2 > N,<br>N > B2/B3, B2~B3 | A3~A2~A1~N > B2~B3 > B1<br>N > B2/B3, A3/A2 > N,<br>A3~A1, B1~B2 |
| Leather | A3~A2 > A1~N > B1~B2 > B3<br>A3 > A1/N, A2 > N,<br>N > B2/B3, B1 > B3 | A3~A2~A1~N > B1~B2~B3<br>N > B1/B2/B3, A3~A1,<br>A2/A3 > N, B1~B3 |

TABLE 3

The mean and SD values of participants' subjective rating levels of perceived roughness.

| | Glass | Ceramic | Paper | Wood | Cotton | Leather |
|---|---|---|---|---|---|---|
| Increase A3 | 41.7 (12.57) | 49.7 (6.54) | 64.9 (7.38) | 71.2 (7.54) | 82.2 (12.67) | 84.1 (12.48) |
| Increase A2 | 36.8 (12.5) | 44.7 (8.43) | 60.5 (6.03) | 69.2 (6.71) | 77.7 (8.86) | 82.5 (11.05) |
| Increase A1 | 31.9 (11.72) | 40.8 (8.34) | 54.2 (5.45) | 62.4 (6.54) | 73.3 (10.75) | 77.5 (10.56) |
| No Stimuli | 17.9 (7.03) | 30.3 (6.89) | 46.1 (5.78) | 58.6 (7.10) | 70.8 (10.84) | 74.1 (9.87) |
| Decrease B1 | 15.7 (4.44) | 26.4 (6.19) | 41.0 (4.72) | 49.3 (10.83) | 64.2 (14.66) | 61.90 (7.08) |
| Decrease B2 | 13.0 (6.27) | 20.5 (9.61) | 37.0 (7.16) | 45.4 (13.16) | 57.6 (15.34) | 60.0 (7.47) |
| Decrease B3 | 11.0 (6.71) | 17.9 (9.36) | 31.9 (11.4) | 38.6 (15.12) | 53.4 (14.08) | 58.0 (6.09) |

Figure 9A:
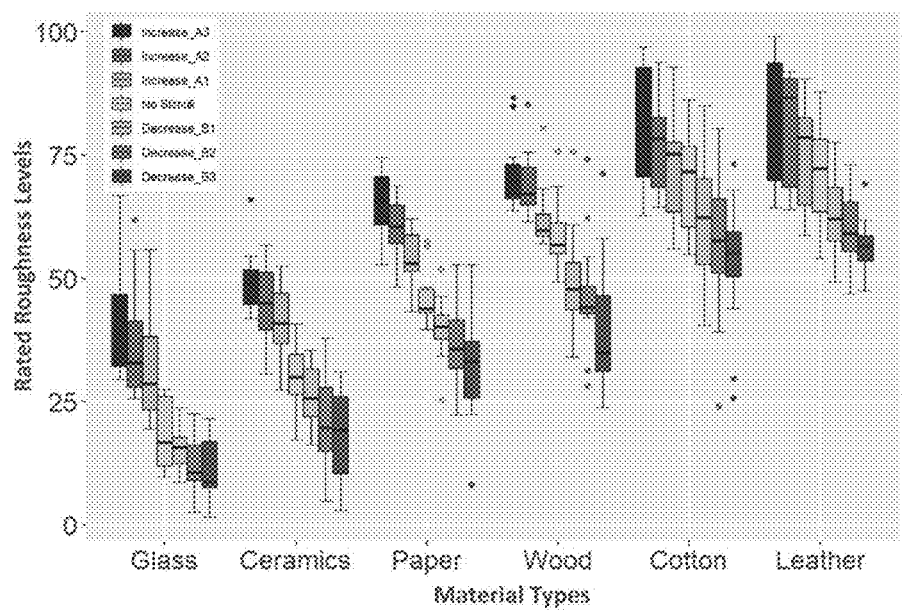
FIGS. 9A-9E depict the results of participants' subjecting level of perceived roughness (FIG. 9A), flatness (FIG. 9B), temperature (FIG. 9C), stiffness (FIG. 9D) and stickiness (FIG. 9E) with "Increased_A1", "Increased_A2", and "Increased_A3" representing the three amplitude levels of vibrotactile stimuli, and "Decreased_B1", "Decreased_B2", and "Decreased_B3" for the three pneumatic actuation levels, and "No Stimuli" for the no-stimuli condition.

FIG. 9A depicts the descriptive results of participants' subjective ratings on the roughness perception, which vary across different stimuli and material types. It is also observed that certain levels of overlapping across different stimuli and materials. For instance, the box plot of "Increase A1" for glass largely covers the range of the box plot for "No Stimuli" on ceramics, while the range of the box plot for paper with "No Stimuli" is overlapped with the box plot of wood with "Decrease B1". This indicates that the device provides a wide range of haptic stimuli that potentially modifies the perceived roughness of one type of material towards another type of material. For instance, with the device, wood can be perceived as smooth as paper under the pneumatic stimuli which reducing the wood's perceived roughness. By increasing the roughness with the device, glass is perceived as rough as ceramics.

Figure 9B:
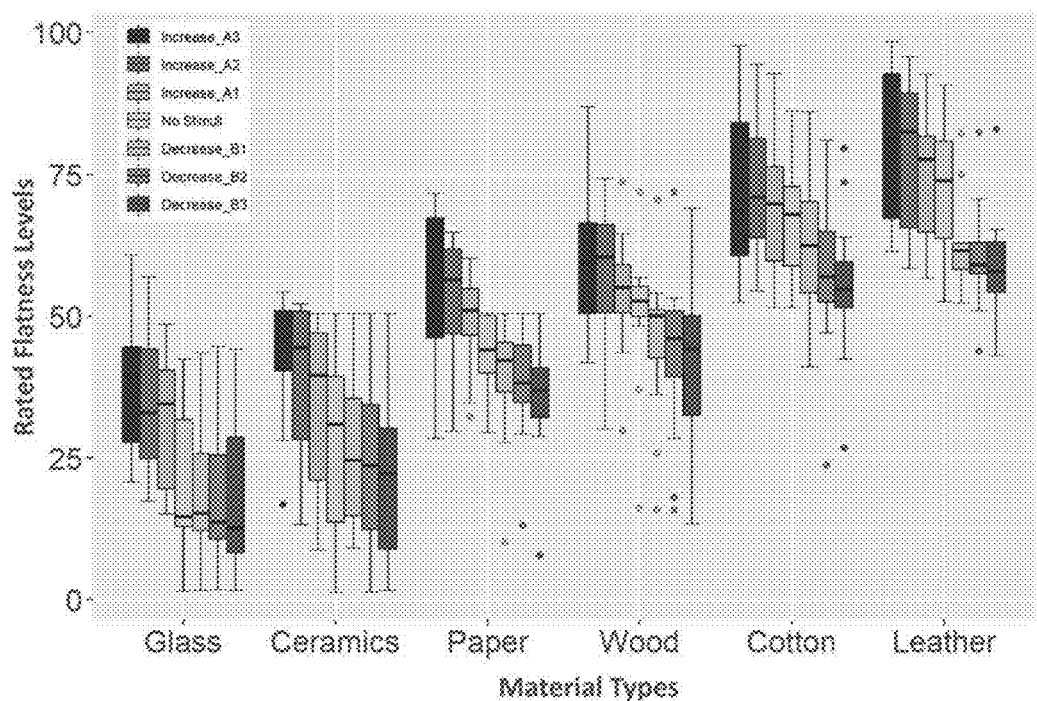
Figure 9C:
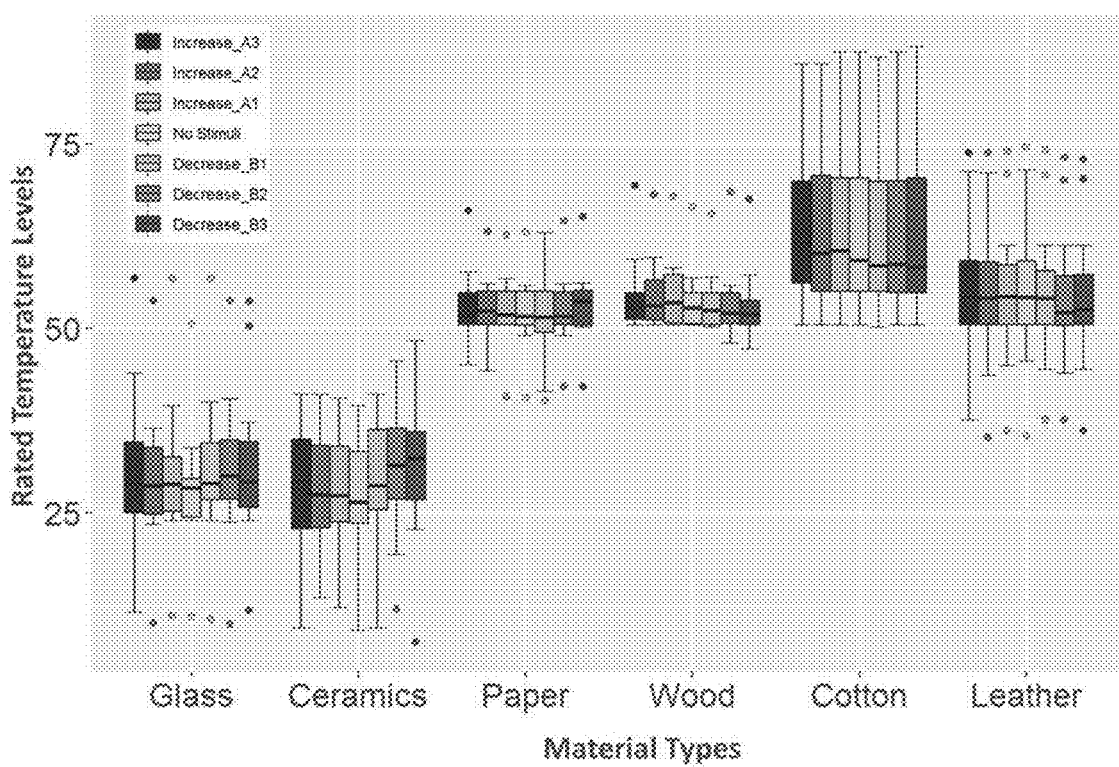
Figure 9D:
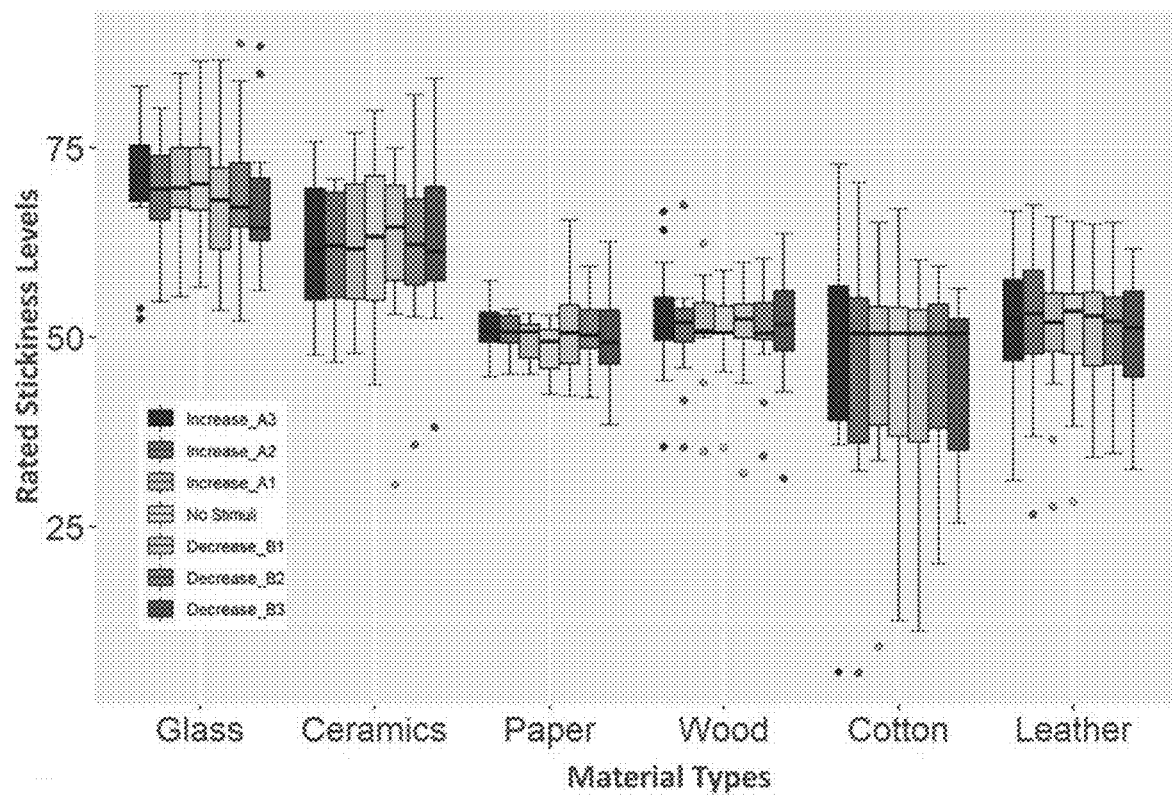
Figure 9E:
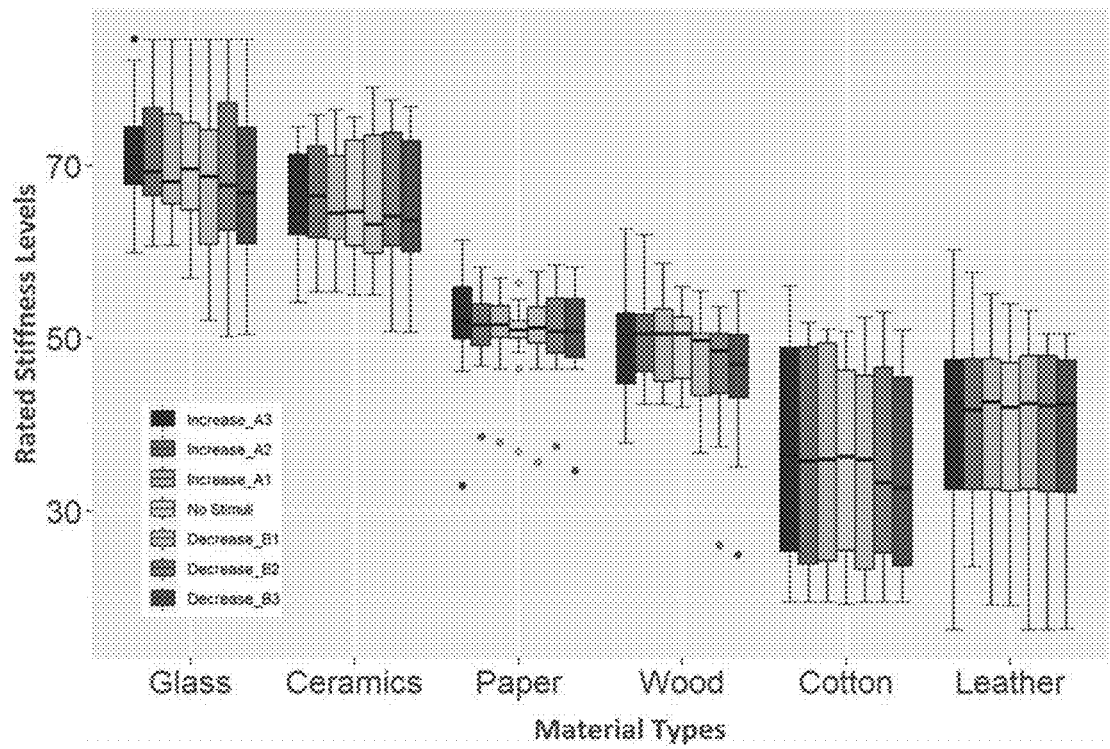

Besides roughness, other haptic properties perceived by the participants are also investigated, including flatness, temperature, stickiness, and stiffness. FIG. 9B shows the descriptive results of subjective ratings on the perceived flatness, which demonstrates a similar trend compared to the results of roughness rating (FIG. 9A). A two-way repeated-measures ANOVA is performed on the participants' flatness ratings, and the results show that both the material type (F (1.969,21.656)=29.399, p<0.0001, $\eta^2_\rho$=0.728) and the stimuli (F (1.231, 13.538)=29.160, p<0.0001, $\eta^2_\rho$=0.726) yield significant effects on the user-rated flatness. Furthermore, a strong correlation is found between perceived roughness and flatness ratings (r (420)=0.882, p<0.001) based on Pearson correlation analysis.

Significant differences are found in temperature (F (5,55)=31.424, p<0.0001, $\eta^2_\rho$=0.741), stickiness (F (1.596, 17.558)=10.811, p<0.0001, $\eta^2_\rho$=0.496) and stiffness (F (1.955,21.510)=31.119, p<0.0001, $\eta^2_\rho$=0.739) across the material types. However, the analysis does not reveal any significant differences in temperature (F (6, 66)=1.304, p=0.268, $\eta^2_\rho$=0.106), stiffness (F (6,66)=2.163, p=0.058, $\eta^2_\rho$=0.164), and stickiness (F (6,66)=0.493, p=0.811, $\eta^2_\rho$=0.043) across different haptic stimuli, shown in FIGS. 10A-10C, for the respective plots. This suggests that the device does not explicitly alter or, in other words, preserves these perceived haptic properties (i.e., temperature, stickiness, and stiffness) of the material surfaces.

Overall, here the capability of altering perceived roughness through the device among six selected materials (glass, ceramics, paper, wood, leather, and cotton) is investigated. The results show that the vibrotactile stimuli generated by the device can increase the perceived roughness of physical materials, with higher vibration amplitude resulting in a rougher perception, particularly for smoother materials such as glass and ceramics. In addition, the device is able to reduce the contact area between the fingerpad skin and the material surface by lifting the fingerpad, which results in a decrease in perceived roughness. It is found that a larger expanded displacement (i.e., higher air pressure levels) yields a lower roughness perception. There are two possible mechanisms that may have contributed to this effect: 1) reducing contact area decreases the applied normal force on the textured surfaces, enabling to decrease the perceived roughness; 2) the smaller skin area with fewer tactile mechanoreceptors yields overall lower levels of perceptual activity stimuli, and roughness perception is positively related to the activity levels of tactile mechanoreceptors. It is assumed that both of these two mechanisms jointly contribute to the perceived roughness reduction.

It is also observed that the device has influenced the perceived flatness (i.e., macro-roughness) of the materials. Okamoto et al suggested that it was difficult for humans to distinguish these two dimensions/concepts: micro-roughness and macro-roughness (i.e., flatness) due to the significant overlap between the perceptual mechanisms and the mental models. This phenomenon is also observed herein, with some participants confusing these two attributes. In the results, the similar trends are found in the participant-perceived flatness and roughness, suggesting that these two dimensions jointly influence the perception of textured surfaces. It is worth noting that all participants agree that the device yields largely flatness decreasing for those bumpy materials, such as taurillon leather. One possible reason is that the reduced contact area results in the decreasing of applied normal force on the leather surface, reducing the sensitivity of spatial patterns on the material surface related to macro roughness.

Additionally, the device has no significant influences on the other three material properties (i.e., temperature, stickiness, and stiffness), suggesting it may potentially preserve these attributes during the physical surface-touching interaction. Previous research has suggested that reducing the applied normal forces and contact area might decrease stickiness or increase cold sensations during contact with textured surfaces. However, in this embodiment, there is no statistically significant changes.

Regarding stickiness perception, it is hypothesized that users might also feel the friction between the silicon tube and the material surface, which may mask any changes in perceived stickiness resulting from the reduced contact area. Furthermore, the users are instructed to maintain a normal pressure within 0.3-1.2 N during finger sliding, resulting in a small actual contact area of the fingerpad skin on the materials. Such the small range of force and contact area variance might not be large enough to perceive significant changes in temperature, as the previous studies have mainly focused on changes in perceived temperature with large contact areas (e.g., over 10 $cm^2$). Furthermore, the participants are not required to actively press on the textured surfaces to perceive stiffness, which may explain why there are no significant changes observed in perceived stiffness, as the applied forces are likely to be relatively steady, but the stiffness perception is related to the change rate of stress.

Example 8. Investigations of how the Device Affects User Experience in MR Environments An MR scene is created using Unity3D (2019.3.4.39f). The application uses HoloLens 2 with a hand-tracking function, a 5-megapixel camera for finger velocity estimation, and the device. The MR scene consists of six physical objects: a wooden board, two cups (one glass and one ceramic), two table mats (one cotton and one leather), and one paper-made box (as shown in Table 4). In MR, to create the visual-haptic matching, virtual objects aligned with those physical objects in terms of size is developed but made with different virtual materials. Specifically, a virtual glass/ceramics cup is rendered on a physical ceramics/glass cup, a virtual leather/cotton table mat is rendered over a physical cotton/leather table mat, and a virtual wooden cube aligns with the paper-made cube, with a virtual paper displays on the surface of the wooden table (applied scenes shown in Table 4). There are two modes of object manipulation: 1) using the bare finger without the device (denoted as BareFinger), and 2) wearing the device with corresponding haptic feedback (denoted as ViboPneumo).

Ten participants (five females and five males) are recruited with an average age of 29.3 years (SD=2.75). All the participants are right-handed and have not attended similar experiments. One of them has previous MR experience but without any experience using haptic devices in MR. The average width of the DIP of the index fingers is 15.7 mm (SD=1.73). A power analysis indicates a sample size of 5 with a 96.1% chance for perceiving the difference between two modes of object manipulation with a 0.05 significance level.

Based on the results of the user-perception experiment described in Example 7, the appropriate haptic stimuli is determined for roughness modulation as follows: deploying vibrotactile stimuli to increase the perceived roughness on the glass cup for the virtual ceramic cup, the paper-made cube for the virtual wooden cube, and the cotton table mat for the virtual leather mat; and the pneumatic actuation to decrease the perceived roughness on the ceramic cup for the virtual glass cup, the wooden board for the virtual paper, and the leather table mat for the virtual cotton mat. According to the results of Example 7 and also considering flatness perception, power-friendly parameters are designed for the intensity of haptic stimuli, shown in Table. 4.

TABLE 4

The applied MR scenes and parameters of haptic stimuli.

| | Physical objects | Virtual objects | Applied stimuli |
|---|---|---|---|
| Roughness increasing (Acceleration $m/s^2$) | Glass cup | Ceramics cup | 3.7 $m/s^2$ |
| | Paper-made box | Wooden board | 4.9 $m/s^2$ |
| | Cotton table mat | Leather table mat | 4.9 $m/s^2$ |
| Roughness decreasing (Air pressure kpa) | Ceramics cup | Glass cup | 10 kpa |
| | Wooden board | Paper-made box | 8 kpa |
| | Leather table mat | Cotton table mat | 6 kpa |

Each session includes one participant and one experimenter. The experimenter introduces the instructions and procedures for the experiment and assists participants in wearing the HoloLens 2 headset and the appropriate haptic modulation devices. Participants are then instructed on how to use the haptic modulation device to interact with objects in the MR environment. They undergo two testing sub-sessions of MR interaction that represents the two object-manipulation modes: BareFinger and ViboPneumo. In the ViboPneumo mode, participants are able to touch and feel the surface texture of various virtual objects through haptic feedback generated from the haptic modulation device, which alters the physical objects. The order of the two modes is counterbalanced for each participant.

At the end of each sub-session, the participant completes a customized questionnaire derived from the presence questionnaire and the system usability scale (SUS) [65], using a 7-point Likert scale (1: strongly disagree-7: strongly agree), mainly focusing on visual-haptic matching experience in MR. After the experiment session, a semi-structured interview is conducted with each participant to gather their qualitative feedback on the device and its potential application.

Figure 10:
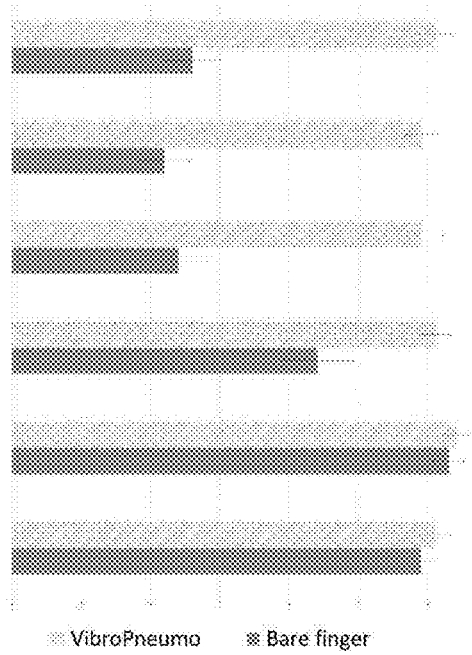
FIG. 10 depicts the questionnaire responses on the MR experience.

FIG. 10 illustrates the comparison between the two object-manipulation modes. Taking the operation mode as the independent factor and the questionnaire responses as the dependent variables, the results are analyzed using the Wilcoxon signed-rank test. The results show that the type of the operating mode significantly affects the participant-rated consistency of visual and haptic information (Z=−2.816, p=0.005), consistency of touch experience in MR and the real world (Z=−2.816, p=0.005), perceived naturalness of the texture (Z=−2.814, p=0.005), the users' preference (Z=2.388, p=0.017). There is no significant difference between these two conditions for the participants' responses to the questionnaire items on the capability of actively surveying or searching the MR environment (Z=−0.378, p=0.705) and usability (Z=−0.816, p=0.414), indicating that the haptic modulation device does not constrain the users' exploration in MR environments and is easy to use for novice users.

Regarding qualitative feedback, the first question for the participants is how they distinguish different objects under the same category (e.g., glass cups and ceramic cups). All the participants mention that they can visually distinguish different table mats in MR, but find it difficult to differentiate different cups due to the overlapping between virtual and physical objects. However, the usage of the device provides different roughness sensations on these materials to enhance their experience in discriminating between ceramic and glass cups. P3 commented, "I can discriminate these two different cups through texture interaction with reasonable haptic experience, but I feel extreme mismatching between visual and haptic experience when I use my bare finger, which is really unpleasant." The participants are asked about their feeling about the virtual wooden box overlaying the paper box. All the participants agree that the paper box with an augmented wooden appearance feels like a wooden texture with the device.

Next, the participants are encouraged to find some possible applications for the device. P8, who has MR experience commented, "I think it could be a useful tool for designers. Some designers use AR to demonstrate different appearances of customized/personalized products, such as clothes, where this system can not only change the appearances but also provide the corresponding haptic feedback of the fabrics." Another participant (P5) commented that it could be used for game control. For example, using the device, a user can control the movements of a virtual role on a physical material surface through MR while experiencing modified perceived roughness to create a matching experience (e.g., the perceived roughness can be decreased when the virtual role walks on a virtual icy surface).

Overall, altering roughness through the device improves the visual-haptic matching experience, enhancing the object perception experience in MR. In a mixed-reality environment, AR allows virtual objects to exist in the real environment, and it is expected that the touching experience of the virtual object is consistent with the visual appearance. Using the physical object as the haptic proxy for the virtual object in MR, it is important for the user to feel a matching visual-haptic experience. The present device can benefit from reusable haptic proxies for diverse haptic texture experiences in MR by altering the perceived roughness while preserving the other material attributes of the physical object. For example, a user can not only feel the original texture of a physical ceramic mug but also alter the roughness of the ceramic mug to feel like a glass or metal material through the present device in MR. Additionally, there are some possible application cases for the device. One straightforward application is for immersive gaming. It is also suggested applying the device to enhance the museum experience. For example, a user can wear the device and touch the glass shell surface with increased roughness through vibrotactile stimuli, to feel the roughness of the ancient pottery inside the glass showcase box. Moreover, the device can assist designers in evaluating a 3D-printed prototype and altering its roughness or switching the material of specific parts, without any extra fabrication requirements. Moreover, the device can also serve as a haptic design tool, aiding in customizing perceived roughness for physical materials.

In summary, the present invention provides a wearable haptic modulation device that alters the perceived roughness of physical objects in mixed reality utilizing vibrotactile and pneumatic feedback. The device features a linear resonant actuator that increases roughness using vibrotactile stimuli and a hollow pneumatic actuator that decreases roughness by reducing the contact area between the user's fingerpad and the physical surface. From the user-perception experiments, it is demonstrated that the device successfully alters the perceived roughness of certain materials. It is also observed that the user-rated roughness levels overlapped across some materials, suggesting the potential to modulate the perceived roughness from one material to another. The user studies on mixed reality experience shows that using the device to alter the perceived roughness of physical materials significantly improved users' visual-haptic matching experience in MR.

In some embodiments, the device may be adopted in several potential applications, for instance, a user can wear the device to explore the surface texture of a museum artifact (e.g., an ancient ceramic vessel) inside a glass shelf, or to select materials and customize products with a free fingerpad for unconstrained texture exploration in MR. The device may be applied to the fields including, but not limited to, art, media, film, culture and heritage preservation.

The functional units and modules of the devices, systems, and/or methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A wearable haptic modulation device for real-time simulation of texture properties of a material surface in a mixed reality environment, comprising:
 a U-shaped pneumatic actuator, configured to surround a fingertip of a user, wherein the U-shaped pneumatic actuator is a multilayer structure with an inflatable non-cured chamber for air-filling;
 a finger-housing support, configured to create a space for containing the fingertip;
 a resonant actuator, positioned on the finger-housing support to generate a vibrotactile feedback for increasing a perceived roughness of a touched physical surface; and
 a pneumatic control system, configured to generate a pneumatic actuation and connected to the U-shaped pneumatic actuator and the resonant actuator;
 wherein the U-shape pneumatic actuator exposes the fingerpad of the fingertip, so that the user's fingerpad directly contacts with the touched physical surface;
 wherein the U-shape pneumatic actuator is inflatable so as to lift the fingerpad and decrease the perceived roughness of the touched physical surface.

2. The wearable haptic modulation device of claim 1, wherein the U-shape pneumatic actuator is driven and inflated by the pneumatic control system in accordance to the pneumatic actuation.

3. The wearable haptic modulation device of claim 1, wherein the pneumatic control system comprises a microcontroller, a wireless communication module, an audio amplifier, an air pressure sensor, a motor driver, a battery and a vacuum pump.

4. The wearable haptic modulation device of claim 1, wherein the resonant actuator is electronically connected with a computing device and a camera, wherein the camera captures an object-touching action of the user's finger and the computing device calculates a velocity of the finger's movement, so that the computing device generates a vibrotactile signal to the resonant actuator for generating the vibrotactile feedback.

5. A method of utilizing the wearable haptic modulation device of claim 1 for real-time modulation of perceived roughness in cooperation with a mixed reality system, comprising;
 detecting an object-touching action of a user through a camera involved in the mixed reality system as a trigger to initiate a roughness-modulation process;
 wherein the roughness-modulation process comprises a roughness decrease aspect and a roughness increase aspect.

6. The method of claim 5, wherein the roughness decrease aspect comprises:
 inflating the U-shape pneumatic actuator to reduce a finger-surface contact area.

7. The method of claim 5, wherein the roughness increase aspect comprises:
 providing the vibrotactile feedback through the resonant actuator.

8. A mixed reality system, comprising the wearable haptic modulation device of claim 1.

* * * * *